US012755302B2

(12) United States Patent
Blaikie, III et al.

(10) Patent No.: US 12,755,302 B2
(45) **Date of Patent: *Oct. 6, 2026**

(54) PLATFORM FOR MANAGEMENT OF USER DATA UTILIZING A DATA PLATFORM

(71) Applicant: Datavault AI Inc., Beaverton, OR (US)

(72) Inventors: Alfred Blair Blaikie, III, Tinton Falls, NJ (US); Nathaniel T. Bradley, Tucson, AZ (US); Joshua S. Paugh, Tucson, AZ (US)

(73) Assignee: Datavault AI Inc., Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/895,362

(22) Filed: Sep. 24, 2024

(65) Prior Publication Data

US 2025/0014076 A1 Jan. 9, 2025

Related U.S. Application Data

(63) Continuation of application No. 17/119,479, filed on Dec. 11, 2020, now Pat. No. 12,100,025.
(Continued)

(51) Int. Cl.
*G06Q 30/02* (2023.01)
*G06Q 20/14* (2012.01)
(Continued)

(52) U.S. Cl.
CPC ....... *G06Q 30/0271* (2013.01); *G06Q 20/145* (2013.01); *G06Q 30/0255* (2013.01);
(Continued)

(58) Field of Classification Search
CPC ............. G06Q 30/0271; G06Q 20/145; G06Q 30/0255; G06Q 30/0276; G06Q 2220/00;
(Continued)

(56) References Cited

U.S. PATENT DOCUMENTS 5,892,900 A 4/1999 Ginter et al.
6,640,304 B2 10/2003 Ginter et al.
(Continued)

FOREIGN PATENT DOCUMENTS

CN 109003176 A 12/2018
CN 110599321 A 12/2019
(Continued)

OTHER PUBLICATIONS

International Search Report and Written Opinions, PCT/US2022/075985, Dec. 6, 2022, 12 Pages.
(Continued)

*Primary Examiner* — Thuy N Nguyen
(74) *Attorney, Agent, or Firm* — Goodhue, Coleman & Owens, P.C.

(57) ABSTRACT

A system, method, device, and platform for monetizing user data utilizing a data platform. User preferences for managing user data are received in the data platform. User data is automatically captured from sources according to the user preferences. Tokenizes the user data in one or more blockchain tokens utilizing the data platform. Monetizes the user data in accordance with the user preferences. Compensates the user for monetizing the user data.

20 Claims, 5 Drawing Sheets

Related U.S. Application Data

(60) Provisional application No. 62/953,276, filed on Dec. 24, 2019, provisional application No. 62/946,646, filed on Dec. 11, 2019.

(51) Int. Cl.
*G06Q 30/0241* (2023.01)
*G06Q 30/0251* (2023.01)
*G06F 21/10* (2013.01)
*H04L 9/00* (2022.01)
*H04L 9/32* (2006.01)
*H04L 9/40* (2022.01)

(52) U.S. Cl.
CPC ..... *G06Q 30/0276* (2013.01); *G06F 21/1014* (2023.08); *G06Q 2220/00* (2013.01); *H04L 9/3213* (2013.01); *H04L 9/3236* (2013.01); *H04L 9/3297* (2013.01); *H04L 9/50* (2022.05); *H04L 63/10* (2013.01)

(58) Field of Classification Search
CPC .... G06Q 30/0207–30/0277; G06F 2221/0711; H04L 9/3213; H04L 9/3236; H04L 9/3297; H04L 9/50
See application file for complete search history.

(56) References Cited

U.S. PATENT DOCUMENTS 7,685,083 B2 3/2010 Fairweather
7,704,138 B2 4/2010 Tallal, Jr.
7,860,763 B1 12/2010 Quinn
8,204,805 B2 6/2012 Eftekhari
8,838,492 B1 9/2014 Baker
9,595,169 B2 3/2017 Lutnick et al.
9,760,953 B1 9/2017 Wang
9,870,588 B1 1/2018 Genov
10,193,695 B1 1/2019 Endress
10,242,518 B2 3/2019 Bradley
10,255,641 B1 4/2019 Goldman
10,282,740 B1 5/2019 Bramwell et al.
10,460,709 B2 10/2019 Bradley et al.
10,482,174 B1 11/2019 Goodsitt
10,628,894 B1 4/2020 Ioannou
10,657,607 B2 5/2020 Linne
10,685,407 B1 6/2020 Cabrera
10,867,355 B1 12/2020 Wang
10,880,074 B2 12/2020 Revankar
10,943,029 B2 3/2021 Marin
10,943,309 B1 3/2021 Morin
11,030,983 B2 6/2021 Bradley
11,074,648 B1* 7/2021 Duccini .............. H04L 63/0861
11,165,560 B2 11/2021 Guillama
11,269,665 B1 3/2022 Podgorny
11,301,582 B2 4/2022 Lee
11,429,975 B1 8/2022 Asefi et al.
2004/0128253 A1 7/2004 Jim
2005/0114266 A1 5/2005 Satkunanathan et al.
2007/0112567 A1 5/2007 Lau et al.
2007/0214095 A1 9/2007 Adams
2009/0157534 A1 6/2009 Arsiwala
2009/0240569 A1 9/2009 Ramer et al.
2009/0264202 A1 10/2009 Chen et al.
2009/0292571 A1 11/2009 Gil et al.
2010/0076876 A1 3/2010 Brady
2010/0179860 A1 7/2010 Noel
2010/0317420 A1 12/2010 Hoffberg
2011/0208621 A1 8/2011 Feierstein
2012/0259826 A1* 10/2012 Zalila-Wenkstern ........................ G06F 16/954 707/706
2012/0303503 A1 11/2012 Cambridge
2012/0304273 A1 11/2012 Bailey et al.
2013/0124427 A1 5/2013 Le et al.
2013/0132300 A1 5/2013 Margolis
2014/0164251 A1 6/2014 Loh
2014/0214636 A1 7/2014 Rajsky
2014/0280231 A1 9/2014 Paruchuri et al.
2014/0351014 A1 11/2014 Lopez
2015/0052025 A1 2/2015 Apsley et al.
2015/0052055 A1 2/2015 Kassemi
2015/0095261 A1 4/2015 Globe et al.
2015/0254704 A1 9/2015 Kothe
2015/0304601 A1 10/2015 Hicks et al.
2015/0379563 A1 12/2015 Franosch et al.
2016/0012465 A1* 1/2016 Sharp .................. G06Q 20/321 705/14.17
2016/0104153 A1 4/2016 Anderson
2016/0119289 A1 4/2016 Jain et al.
2016/0140668 A1 5/2016 Maguire
2016/0225037 A1 8/2016 Ezumba
2017/0011350 A1 1/2017 Jones-McFadden et al.
2017/0052676 A1 2/2017 Pulier et al.
2017/0069046 A1 3/2017 Slipakoff et al.
2017/0111345 A1 4/2017 Heiman
2017/0178236 A1 6/2017 Saigh et al.
2017/0214522 A1 7/2017 Code
2017/0220540 A1 8/2017 Wang
2017/0236094 A1 8/2017 Shah
2017/0243143 A1 8/2017 Engstrom
2017/0301026 A1 10/2017 Bensemana
2017/0330174 A1 11/2017 DeMarinis et al.
2017/0372278 A1 12/2017 Frolov et al.
2018/0040073 A1 2/2018 Ghosh
2018/0089759 A1 3/2018 Stradling et al.
2018/0107958 A1 4/2018 Konik et al.
2018/0121337 A1 5/2018 Unsal
2018/0144153 A1* 5/2018 Pead ..................... H04L 63/102
2018/0150837 A1 5/2018 Kirch et al.
2018/0189753 A1 7/2018 Konda et al.
2018/0191502 A1 7/2018 Karame
2018/0211332 A1 7/2018 Kraemer et al.
2018/0218465 A1 8/2018 Lenea
2018/0247302 A1 8/2018 Armstrong
2018/0268162 A1 9/2018 Dillenberger
2018/0309569 A1 10/2018 Martin et al.
2018/0314884 A1 11/2018 Lee
2018/0322587 A1 11/2018 Linne
2018/0322597 A1 11/2018 Sher
2018/0359041 A1 12/2018 Lee et al.
2018/0365633 A1 12/2018 Hanis et al.
2019/0013932 A1 1/2019 Maino et al.
2019/0013933 A1 1/2019 Mercuri et al.
2019/0013948 A1 1/2019 Mercuri et al.
2019/0019208 A1* 1/2019 Postrel ............... G06Q 30/0214
2019/0043050 A1 2/2019 Smith et al.
2019/0044741 A1 2/2019 Middleton
2019/0058595 A1 2/2019 Hamasni et al.
2019/0080402 A1 3/2019 Molinari et al.
2019/0087844 A1* 3/2019 Leekley ............. G06Q 30/0215
2019/0095439 A1 3/2019 Cai
2019/0108482 A1 4/2019 Vikas et al.
2019/0108516 A1 4/2019 Jawaharlal et al.
2019/0130392 A1 5/2019 Kale
2019/0130483 A1 5/2019 Jong
2019/0130484 A1 5/2019 Jong
2019/0147190 A1 5/2019 Marin
2019/0156000 A1 5/2019 Hoffmann et al.
2019/0156304 A1 5/2019 Hudson et al.
2019/0163700 A1 5/2019 Baumgardner et al.
2019/0164223 A1 5/2019 Jong
2019/0166095 A1 5/2019 Tobin
2019/0171830 A1 6/2019 Leporini et al.
2019/0172153 A1 6/2019 Wyle
2019/0173854 A1* 6/2019 Beck ....................... H04L 67/10
2019/0180266 A1 6/2019 Sidhu
2019/0199689 A1 6/2019 Mckellar et al.
2019/0205932 A1* 7/2019 Ericson ............. G06Q 20/0658
2019/0228461 A1 7/2019 Domokos et al.
2019/0253431 A1 8/2019 Atanda
2019/0258780 A1 8/2019 Minina et al.
2019/0334726 A1 10/2019 Kelly
2019/0342095 A1* 11/2019 Simons ................... H04L 69/26

(56) References Cited

U.S. PATENT DOCUMENTS

| | | | | |
|---|---|---|---|---|
| 2019/0342336 | A1 | 11/2019 | Finkelstein | |
| 2019/0347442 | A1* | 11/2019 | Marlin | G07F 19/206 |
| 2020/0007333 | A1 | 1/2020 | Young | |
| 2020/0013093 | A1* | 1/2020 | Brooks | G06Q 30/0275 |
| 2020/0042989 | A1 | 2/2020 | Ramadoss et al. | |
| 2020/0058023 | A1 | 2/2020 | Travizano | |
| 2020/0098071 | A1 | 3/2020 | Jackson | |
| 2020/0126114 | A1 | 4/2020 | Kuo et al. | |
| 2020/0202324 | A1 | 6/2020 | Sarin | |
| 2020/0210997 | A1 | 7/2020 | Sarin | |
| 2020/0219150 | A1 | 7/2020 | Johnston | |
| 2020/0236091 | A1 | 7/2020 | Cooley | |
| 2020/0272760 | A1* | 8/2020 | Kurian | H04L 9/0822 |
| 2020/0302482 | A1 | 9/2020 | Shakespeare | |
| 2020/0334376 | A1 | 10/2020 | Bragdon et al. | |
| 2020/0351310 | A1 | 11/2020 | Leighton et al. | |
| 2020/0394619 | A1 | 12/2020 | Afaneh | |
| 2020/0394723 | A1 | 12/2020 | Baker | |
| 2021/0082548 | A1* | 3/2021 | Bloxton | G16H 20/30 |
| 2021/0150558 | A1 | 5/2021 | Xiao et al. | |
| 2021/0182431 | A1 | 6/2021 | Marin | |
| 2021/0192075 | A1* | 6/2021 | Sweeney | G06F 21/6245 |
| 2021/0192652 | A1* | 6/2021 | Blaikie, III | G06Q 50/18 |
| 2021/0243175 | A1 | 8/2021 | Zang et al. | |
| 2021/0326857 | A1 | 10/2021 | Yantis et al. | |
| 2021/0365526 | A1 | 11/2021 | Sachson et al. | |
| 2022/0215439 | A1* | 7/2022 | Blaikie, III | G06Q 30/0261 |
| 2022/0270081 | A1 | 8/2022 | Yantis et al. | |
| 2022/0292547 | A1 | 9/2022 | Peurifoy et al. | |
| 2022/0309540 | A1 | 9/2022 | Blaikie, III | |
| 2022/0309541 | A1 | 9/2022 | Blaikie, III | |

FOREIGN PATENT DOCUMENTS

| | | | |
|---|---|---|---|
| CN | 110634056 | A | 12/2019 |
| CN | 110807679 | A | 2/2020 |
| CN | 110990820 | A | 4/2020 |
| CN | 111028023 | A | 4/2020 |
| CN | 111159257 | A | 5/2020 |
| CN | 111159274 | A | 5/2020 |
| CN | 111292174 | A | 6/2020 |
| CN | 111402051 | A | 7/2020 |
| CN | 111415238 | A | 7/2020 |
| CN | 111724240 | A | 9/2020 |
| CN | 111861688 | A | 10/2020 |
| CN | 111861721 | A | 10/2020 |
| CN | 111818095 | B | 12/2020 |
| CN | 112381634 | A | 2/2021 |
| CN | 112598488 | A | 4/2021 |
| CN | 112613961 | A | 4/2021 |
| CN | 113129086 | A | 7/2021 |
| CN | 113129119 | A | 7/2021 |
| EP | 3432240 | A1 | 1/2019 |
| WO | 2016112099 | A1 | 7/2016 |
| WO | 2017160992 | A1 | 9/2017 |
| WO | 2017197110 | A1 | 11/2017 |
| WO | 2018172839 | A1 | 9/2018 |
| WO | 2018209148 | A1 | 11/2018 |
| WO | 2019010063 | A1 | 1/2019 |
| WO | 2019023286 | A1 | 1/2019 |
| WO | 2019078878 | A1 | 4/2019 |
| WO | 2019079510 | A1 | 4/2019 |
| WO | 2019089044 | A1 | 5/2019 |
| WO | 2019101724 | A1 | 5/2019 |
| WO | 2019143593 | A1 | 7/2019 |
| WO | 2020025141 | A1 | 2/2020 |
| WO | 2020097115 | A1 | 5/2020 |
| WO | 2020205642 | A1 | 10/2020 |

OTHER PUBLICATIONS

L. D. W. Thomas and A. Leiponen, "Big Data Commercialization," in IEEE Engineering Managment Review, vol. 44, No. 2, pp. 74-90. Second Quarter (2016). Doi: 10.1109/EMR.2016.2568798. (Year: 2016).

Saraji et al. "A blockchain-based carbon credit ecosystem." (2021 ). Jul. 1, 2021 (Jul. 1, 2021} Retrieved on Oct. 24, 2022 (Oct. 24, 2022) from . 12 pages.

* cited by examiner

PLATFORM FOR MANAGEMENT OF USER DATA UTILIZING A DATA PLATFORM

PRIORITY

This application is a continuation of U.S. Non-provisional patent application Ser. No. 17/119,479, filed Dec. 11, 2020 now U.S. Pat. No. 12,100,025 which claims priority to U.S. Provisional Patent Application No. 62/946,646 filed Dec. 11, 2019 and U.S. Provisional Patent Application No. 62/953,276 filed Dec. 24, 2019, respectively, all of which are hereby incorporated by reference in their entireties.

BACKGROUND

I. Field of the Disclosure

The illustrative embodiments relate to personal data management. More specifically, but not exclusively, the illustrative embodiments relate to a network, system, method, apparatus, and platform for data tokenization, and monetization.

II. Description of the Art

The generation of various types of data including personal and commercial data has increased exponentially in recent years. Corporations and consumers create and store large volumes of unstructured data from multiple sources with no way of refining, valuing, and monetizing their data. Consumers' data is commonly generated and monetized from consumer web searches, profile data, social media profiles, and online surveys that generate revenue through advertisement delivery with no compensation to the actual owners of the data, the individual consumers/users, consumer groups, organizations, and data generators themselves.

SUMMARY OF THE DISCLOSURE

The illustrative embodiments provide a system, method, device, and platform for monetizing user data. User preferences for managing user data are received in the data platform. User data is automatically captured from sources according to the user preferences. Tokenizes the user data in one or more blockchain tokens utilizing the data platform. Monetizes the user data in accordance with the user preferences. Compensates the user for monetizing the user data. Another embodiment provides a system performing the method, and a data platform including a processor for executing a set of instructions and a memory storing a set of instructions configured to perform the method herein described.

Another illustrative embodiment provides a system, method, device, and platform for monetizing user data utilizing a data platform. One or more data elements associated with user data of a user are received from one of a number of sources. One or more tokens are created based on the user data. The user data is stored in a secure location. The user data is vended to one of a number of parties utilizing the one or more tokens. The user data is accessible from the secure location utilizing an indicator included in the one or more tokens. The user is compensated for vending the user data.

Another embodiment provides a system for monetizing user data. The system includes electronic devices executing a data application. The data application is configured to capture the user data associated with a user. The system also includes a data platform accessible by the electronic devices executing the data application through one or more networks. The data platform receives one or more data elements associated with the user data of the user from one of a plurality of sources, creates one or more tokens based on the user data, store the user data in a secure location, vends the user data to one of a plurality of parties utilizing the one or more tokens, and compensates the user for vending the user data, wherein the data is accessible from the secure location utilizing an indicator included in the one or more tokens.

Another embodiment provides a system for utilizing user data. The system includes electronic devices executing a data application. The data application is configured to capture the user data associated with a user. The system also includes a data platform accessible by the electronic devices executing the data application through one or more networks. The data platform receives one or more data elements associated with the user data from the electronic devices, automatically confirms the one or more data elements are applicable to the user, adds the one or more data elements to a data set associated with the user, determines whether the data set is complete after adding the data element to the data set, and creates one or more tokens based on the data set of the user.

Another embodiment provides a data platform. The data platform may include a processor for executing a set of instructions and a memory for storing the set of instructions. The set of instructions may be executed to receive one or more data elements associated with the user data from one of a number of sources, automatically confirm the one or more data elements is applicable to the user, add the one or more data elements to a data set associated with the user, determine whether the data set is complete after adding the data element to the data set, and create one or more tokens based on the data set of the user.

In other embodiments, one or more of the following may be implemented. Instructions are received from the user specifying how the data set is utilized and the user is compensated for sharing the tokens with one or more interested parties. Additional data elements may be requested in response to determining the data set is incomplete utilizing questions, surveys, and a user profile associated with the user. The one or more data elements are authenticated as being associated with the user. The token is a block chain crypto token and points to the data set for secure access by one or more interested parties. Distinct data sets are clustered into a data pool, the data pool is cross populated with distinct data sets, and the data pool is segmented to identify saturation, missing, incomplete, or nonrelevant data. A determination is made regarding the relevance of the data pool to one or more interested parties. Payments are received from one or more interested parties to access the data set utilizing the token. One or more users are compensated for granting access to their data sets. The interested parties represent advertisers, marketers, or businesses that desire access to the user data in the data set.

The illustrative embodiments provide a system, method, and platform for monetizing data. A selection is received from a user to monetize data associated with the user. The data associated with user is compiled. A security token is generated including the data. The data is monetized utilizing the security token in accordance with the selection.

In other embodiments, the data may include digital profiles that are monetized for data. Data validation may be performed through user opt-ins that are identified and confirmed by the user. Token based compensation for consumer data allows for the direct control and monetization of their data (e.g., web data, application data, profiles, personal measurements, readings, etc.). Compensation may be performed through digital currencies, hard currencies, charitable contributions, and tax deductions. The earnings for a user may also be donated. Users may be rewarded for additional data uploads, updates, additions, amendments, surveys/questionnaire fulfillment, and so forth. The tokens may be utilized to pay a vendor or third party for a product, service, system, or data, secure a digital asset, tracking the life of an asset, share a stake in an asset or company, participate in an initial coin offering, receive a reward, maintaining and managing a digital asset, make a charitable contribution, or receive a tax deduction.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
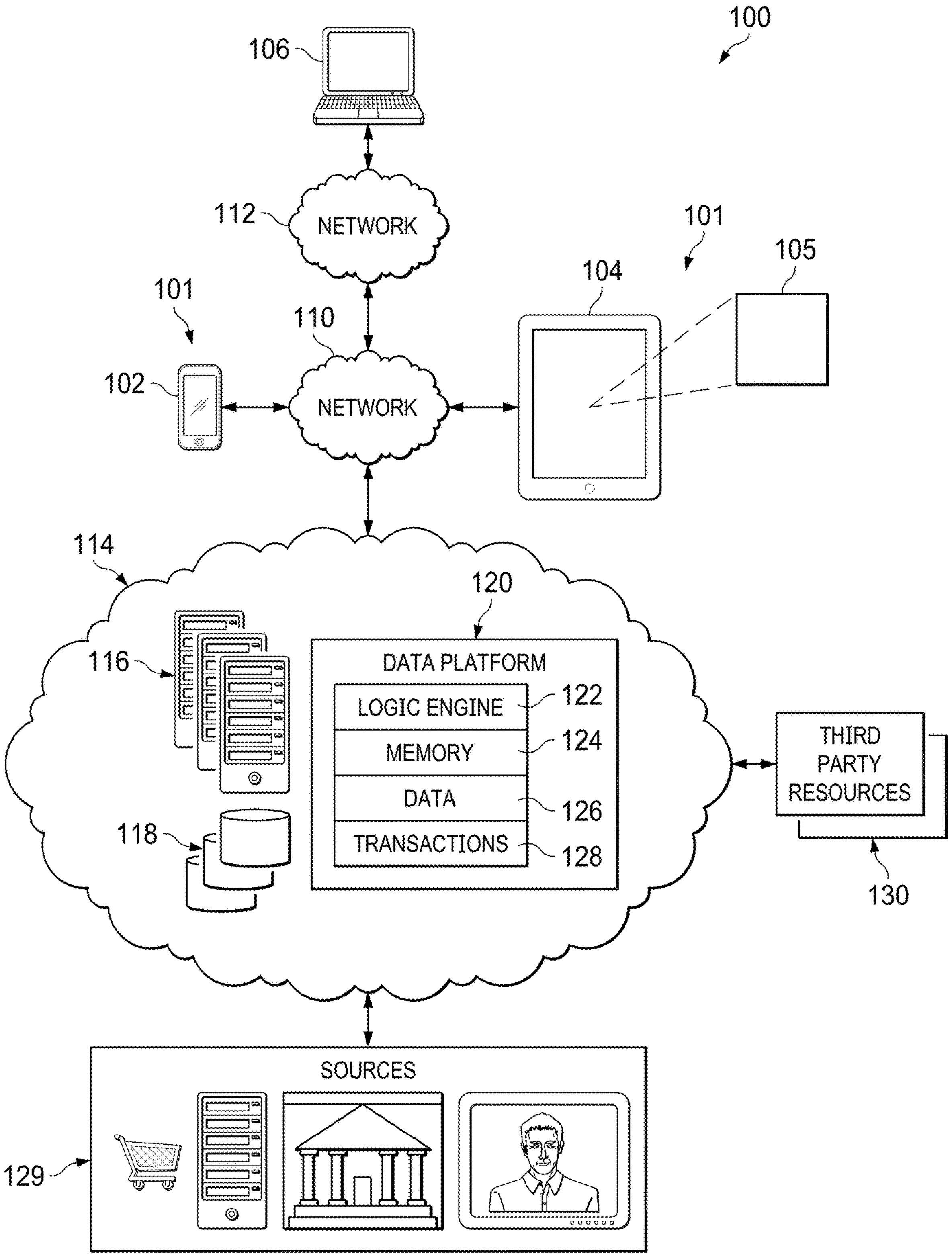
FIG. 1 is a pictorial representation of a system for managing user information in accordance with an illustrative embodiment.

The illustrative embodiments provide a network, system, method, platform and devices for data segmentation for improved data management. The data management may include data control, data governance, and data valuation. The illustrative embodiments provide individual consumers, entities, organizations, corporations, and data vendors a measurements, pool, segment, and value for consumer and corporate data. As a result, the data may be utilized as a measurable asset. The data value may be derived from the segmentation and identification of unique data points within a larger shared data pool. The utilization of the data provides for equity holdings, credit card activity, and user specified parameters and preferences to be processed for the purpose of targeting advertisements to consumers. The illustrative embodiments create a relationship between data sets regarding ownership of stock portfolios, equities, and user associated interests and the products that consumers buy or are shopping for that are owned by the companies represented within their portfolios.

Data tracking and segmentation provides for improved real-time and online advertisements, product recommendations, stock tips and shopping recommendations via an ad-targeting network. The improvements allow advertisements to be selectively targeted based on consumer profiles that may include real-time and historical purchasing data and the real-time and historical stock and equity portfolios. Data from multiple primary sources may be leveraged towards the targeted advertising including stock trading data, stock custody data, and consumer credit/debit card transaction data.

The advertising network data is processed, and advertisements are delivered to users/consumers so that they can act in their own best interests and purchase products, services, and commodities that are in alignment with their holdings. This technology tool provides investors who own stock in specific companies a means to support that stock ownership by receiving targeted purchase recommendations and advertisements that allows consumers them to make informed purchase decisions that facilitate and support the success of each stock held within own individual investor portfolio by purchasing those products. Alternatively, when users buy products outside the products represented in their portfolios, the user may receive data and advertisements from brokers to buy or switch to the stocks associated to those products.

The illustrative embodiments utilize data records from stock transactions, equities, credit card transactions, user preferences, and other self-interests to perform targeted advertisements. Different data clearing houses, groups, or parties may be utilized to process and verify user and consumer data. For example, every stock transaction including the stock, shares, amount, type of transaction (e.g., limit, market, short, futures transaction, option, etc.), and other information is received, processed, and stored.

The illustrative embodiments provide a system, method, platform, and network for encrypting, securing, developing, and managing data valuations, transactions, and utilization. The data may be accessible from any number of authorized and connected devices. The illustrative embodiments allow users/consumers, consumer groups, companies, organizations, entities, governments, and other parties worldwide to develop data strategies and the conversion of any data into a monetizable asset (including a transactable token currency). For example, a platform is provided for capturing, identifying, monetizing, converting, utilizing, and improving data.

As referenced herein, data refers to the personal or commercial data, user profiles, web profiles, search profiles, application profiles, and other information applicable to a user, consumer, entity, device, system, or other party. The illustrative embodiments comply with all applicable data privacy and administration rules, laws, and best practices. Any number of mobile devices, computers, machines, servers, arrays, or so forth may be utilized to implement the illustrative embodiments. A user may tokenize his/her data and convert all applicable data into an asset that may be controlled, valued, and monetized in commercial transactions. The illustrative embodiments also provide the user the ability to control data generation and the seamless utilization of the data. For example, algorithmic processing may determine how and when online and digital data is utilized and monetized, the price point or fair data valuation based on applicable pricing (e.g., demographic, global, location, utilization, etc.) based on going rates, principles of supply and demand, market economics, market analysis, machine learning, exchanges, auctions, real-time bidding, artificial intelligence, and so forth. Relevant information regarding data utilization may be acquired in real-time, based on historical transactions/archives, selling prices, or other applicable information or data that informs the value of a data sale or transaction. The illustrative embodiments allow the end user to select advertisement preferences that coincide with their stocks/shares, ownerships, interests, holdings, demographics, opinions, behaviors, beliefs, social structure, purchase plans, and real-world desires. The opportunity for the user to sell the data to the highest bidder provides enhanced choices for managing and utilizing their personal data that are not allowed by existing systems, such as cookie tracking based advertisements.

The illustrative embodiments may receive, process, collect, and source data from any number of traditional data collection methods, such as online (e.g., websites, mobile applications, user profiles, etc.) and real-world sources (e.g., location, retail purchases, credit card purchases, etc.). The illustrative embodiments are a considerable improvement over traditional targeting, advertising, and marketing techniques, processes, and systems. For example, traditional blind advertisements may be transformed into a precisely targeted advertisement based on user verified and confirmed data, sources and information allowing each individual user to indicate products and service interests. Data in each user's data profile may be effectively utilized. Data, profiles, data sets, data pools, and other compilations may be tokenized to better protect, manage, and monetize the various types of data. The illustrative embodiments improve the functionality of computer networks that process information to be monetized.

In one embodiment, tokens may be created that track the data. The tokens may include information or metadata regarding the data and may point to a location where the data is stored. The token may be utilized to provide a key, identifier, pointer, indicator, or link required to securely access the data. As a result, the tokens may be created, communicated, bought, sold, and otherwise monetized through a block chain system. The tokens may include a pointer that securely points to the data being monetized whether for a single user, organization, company, or multiple users. In another embodiment, the tokens themselves may include the data that is being monetized or otherwise exchanged.

The illustrative embodiments may be utilized to perform a transaction for the data. The data may be grouped, associated, and commoditized for any number of trades, exchanges, purchases, donations, or other transactions. The data may be associated with a platform for transactions involving the data and associated advertisements. The transaction may be performed automatically or based on user input, feedback, instructions, or commands.

One embodiment provides a blockchain based security token system that gives consumers the ability to control, monetize, and/or donate any or all of the proceeds from the utilization, sale, or sharing of their profile and/or data and advertising-based revenue. The illustrative embodiments curate or collect data in real-time from users based on an opt-in system with clear compensation and renumeration guidelines. For example, any number of computing or communications devices, platforms, applications, or so forth may be utilized to capture the data.

The security tokens utilized may represent any number of existing, custom/proprietary, and other tokens. In one embodiment, formatted, structured, or unstructured data may be converted into an encrypted token that represents, includes, or references the applicable data. The security interest in a data asset may be represented in the form of a token. Data across numerous fields and with different utilizations may be captured in a token (or tokenized). For example, intelligence, counterintelligence, consumer profiles, consumer/user, private, public, and other types of data may be captured and monetized. For example, the illustrative embodiments may provide a data management system that allows an asset, such as ownership of a digital profile to be tokenized as an asset that may be tracked, grown, and expanded through an opt in submission from multiple sources and monetized digitally through an e-commerce platform.

The security tokens may be issued, regulated, managed, and distributed by a platform to comply with the existing regulatory framework. The platform may provide a data monetization process for creating and performing transactions between buyers and sellers (e.g., similar to a stock trading platform). The illustrative embodiments may apply pricing based on a set price range, guidelines, industry-standard, or market rate. The data in the form of a token may allow the user to directly control and monetize their data in a transparent and secure blockchain platform. Consumers may receive security tokens in several ways when they sign up to participate in the system/service, when and where they opt in to include their data in the marketplace, and when corporations and/or third parties purchase or monetized access to their data. For example, the data may be managed within a self-directed and mobile computing environment. The illustrative embodiments allow users to determine how and when their data is shared and monetized eliminating guesswork used by search, advertising, and marketing companies to generate user approved and desired consumer marketing data.

In one embodiment, the asset of data is created by the opt-in submission of a user's stock/ownership/interest profile, trading profile/account, social network profile(s), website utilization profiles, or generic/customized profile, and the associated data. The platform may be further used to secure all rights to any revenue streams associated with the data asset (e.g., any sale, sharing, or monetization of the user profile to a third party, site, or advertiser). By opting into the program, the user is providing their profile and perfecting the profile to match their actual daily living and purchases of products. As a result, the illustrative embodiments put the user in full control of the use and monetization of their data while avoiding the erroneous or inaccurate use of information inherent in currently available advertising programs and systems. The illustrative embodiments take third-party unauthorized or on monetized used of poor user data and enables an accurate and monetized data stream to be created for the user. The user benefits as do the third parties that are using the more accurate data. For example, assets associated with the user (e.g., stocks, hedge funds, business entities, charitable organizations, etc.) may benefit by adding revenue, increasing in value/valuation, and otherwise benefiting the user.

The illustrative embodiments may enable the user to track utilization and monetization of their data in a more transparent fashion. As a result, the user may be able to see and track dividends, revenue sharing, price appreciation, or other forms of asset monetization. For example, a value-based reward system tracked utilizing blockchain may be implemented. Smart contracts may be utilized with blockchain to ensure proper utilization and monetization of the data for verification purposes. The secured token generation process of the user data/profile provides proof of ownership to the user and ensures contract conditions are written into the smart contract code within the blockchain structure. The blockchain records maintain and track the creation, issuance, management, and monetization of each token throughout the lifetime of the user's involvement and ownership of their data. In one embodiment, a user may be rewarded with additional tokens for keeping their data/profile updated as well as keeping the data current through additional participation in surveys, watch a video, verify, a purchase, add studies, product marketing, expanded data provisioning, and questionnaires.

The user may be incentivized to provide additional data, such as pictures, audio content, videos, location (e.g., real-time, GPS, beacon, triangulation, delayed for safety, historical, etc.), Internet protocol address, identification of friends from each social network, sharing access to third-party applications, search data, views, likes, shares, comments, and so forth. As a result, the user may specify advertisement preferences that are associated with their stocks, portfolio, assets, equities, holdings, interests, demographics, opinions, behaviors, beliefs, social structure, purchase plans, and real-world desires. The user data that is recorded and stored may reside permanently on the blockchain, but typically only has a three-year lifecycle to be relevant. Thus, the user is incentivized to maintain, share, and update their data and associated profiles.

The data profile may be singular to a user or may be expanded to include deeper insights into a family, group of friends, employees, or other affiliated or associated groups. For example, a family circle profile may include an opt in for parents, children, grandparents, uncles, cousins, neighbors, family friends, and so forth. The data profile may be shared as a family asset between a partner, spouse, and children allowing the family data to be managed and monetized as a single asset. As a result, advertisers and others may get deeper insights into participating users. The illustrative embodiments manage the data collection, pricing, reconciliation, verification, payments, or so forth. Advertisers may be able to identify consumer data that is relevant to their campaign in order to provide direct incentives and/or monetization for users who provide specific advertiser-based insights. For example, a user may select to support a corporate restaurant of which a brother is a part-owner, an online educational institute that a friend works for, or a business that supports charities approved of by the user.

The illustrative embodiments may also allow user to transfer or donate the revenue or value generated for a charitable deduction or associated tax deduction. Each of the described data components is 100% opt in with users being rewarded for sharing specific data points that are desirable to advertisers or other third parties. For example, users may opt-out of specific data points that the do not wish to share with advertisers. The data captured by the illustrative embodiments may be consolidated and purchased by advertisers who provide incentives, rewards, or donations in exchange for access to users and focus group data used for the mining of advertiser-based user insights, analytics, marketing, and advertisement targeting.

The illustrative embodiments may also be utilized to create a data index that catalogs user profiles, data sets, and data transactions. Advertisers may then select a pricing structure for each type of data profile component that is desirable to advertisers thereby creating a virtual market for advertisers to purchase real time user data. The changing values of the data may be tracked over time for specific user profiles, consumer groups, and data pools based on their value to advertisers. The use of security tokens tied to user profiles creates a marketable asset that gives greater validity to commercial uses of blockchain technologies and the security token market.

Cryptographic, security, or digital tokens may be exchanged for actual currency, preferred stock options, stock warrants, bonds, exchange traded fund (ETF) shares, cryptic or, initial coin offerings (ICO), gift cards, vouchers, and other forms of compensation. Tokens may be utilized to communicate data and compensate users, service providers, aggregators, advertisers/marketers, and other applicable parties. The systems may also manage any number of smart contracts between relevant parties, such as the users/consumers, service providers, network operators, content providers, and so forth. The tokens utilized by the illustrative embodiments may be utilized for any number of purposes including compensation, communicating the data, data sets, and data pools, and secure management of the data. The system may utilize multiple types of tokens (e.g., asset tokens, utility tokens, etc.) that are utilized together within the blockchain. Various smart contracts and/or decentralized applications may be self-executed to process and manage the various transactions occurring on the blockchain. The illustrative embodiments including the systems, methods, devices, processes, and components described herein may implement any number of blockchain implementations.

The block chain system may utilize crypto-protocols and crypto-token-protocols. For example, the block chain system may generate tokens, manage a protocol utilizing a consensus algorithm, and record the transactions and other actions in a distributed ledger. The various protocols may control who, when, and how the various parties may control and otherwise manage the blockchain through any number of public and private permissions.

FIG. 1 is a pictorial representation of a system 100 for managing user information in accordance with an illustrative embodiment. In one embodiment, the system 100 of FIG. 1 may include any number of devices 101, networks, components, software, hardware, and so forth. In one example, the system 100 may include a smart phone 102, a tablet 104 displaying graphical user interface 105, a laptop 106 (altogether devices 101), a network 110, a network 112, a cloud system 114, servers 116, databases 118, a data platform 120 including at least a logic engine 122, a memory 124, data 126, tokens 127, and transactions 128. The cloud system 114 may further communicate with sources 131 and third-party resources 130. The various devices, systems, platforms, and/or components may work alone or in combination.

Each of the devices, systems, and equipment of the system 100 may include any number of computing and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 100 may be utilized by any number of users, organizations, or providers to aggregate, manage, review, analyze, process, distribute, advertise, market, display, and/or monetize data 126. The data may include personal data, commercial data, data sets, data pools, and other forms of data. For example, the data 126 may be utilized in marketing or advertisements for goods or services associated with the user (as well as family and friends as allowed or specified). In one embodiment, the goods and services represent any number of items, content, products, or services sold by a business, entity, organization, or entity. In one embodiment, the system 100 may utilize any number of secure identifiers (e.g., passwords, pin numbers, certificates, etc.), secure channels, connections, or links, virtual private networks, biometrics, or so forth to upload, manage, and secure the data 126, generate tokens, and perform applicable transactions. As noted, the system 100 may be a blockchain system that utilizes a digital ledger to track tokens 127, transactions 128 involving the data 126 and advertisements 129. For example, the digital ledger may store the data 126, tokens 127, transactions 128, and advertisements 129 along with their details, information, and data. The devices 101 are representative of multiple devices that may be utilized by businesses or consumers, including, but not limited to the devices 101 shown in FIG. 1. The devices 101 utilize any number of applications, browsers, gateways, bridges, or interfaces to communicate with the cloud system 114, platform 120, and/or associated components. The devices 101 may include any number of Internet of Things (IoT) devices.

The data 126 may include a number of different data types. The data 126 may include demographic data, consumer data, family and health data, property data, ownership data, purchase data, behavioral data, interests and activity data, and other applicable types of data. The data 126 or advertisements 129 may store the good, services, and products that the user is interested in. The user may represent individuals, families, groups, entities, businesses, aggregations, or other parties.

Demographic data may be a combination of static and influx data points that include age, gender, occupation, marital status, education/education level, income level, religion, birthday, family size, and so forth. Demographic data, although mostly static, is commonly quite important to marketers and other interested parties. Consumer data may include websites visited, purchase plans, purchases, brand affinity, cars, clothes, travel, and other information applicable to users, clients, customers, groups, or so forth. The family and health data may include permanent or long-lasting data elements which may be helpful for predicting future purchases and include information related to family, health, and medical conditions, such as childcare, diapers, diabetes, incontinence, rental information, and so forth. The family and health data have a large potential for cross marketing of data. Property data may include information regarding ownership, rentals/renters, address, for sale, occupants, pool, and vehicle ownership. This data may be treated and value as static data (even though changes are likely and expected). The interests and activity data may include data regarding hobbies, general interests, product and brand preferences, and other applicable influx data. Political affiliation data may be a matter of public record in many states as the user self identifies. The data may be static or perennial based on the user's voting record. The user may choose to self-identify political and voting information or may keep that private.

The wireless device 102, tablet 104, and laptop 106 are examples of common devices 101 that may be utilized to capture, receive, and manage data 126, perform transactions 128, and communicate advertisements 129. For example, the various devices may capture data relevant to the user that is subsequently monetized for the benefit of the user (e.g., location, purchases, behavior, web activity, application use, digital purchases, etc.). Other examples of devices 101 may include e-readers, cameras, video cameras, electronic tags, audio systems, gaming devices, vehicle systems, kiosks, point of sale systems, televisions, smart displays, monitors, entertainment devices, medical devices, virtual reality/augmented reality systems, or so forth. The devices 101 may communicate wirelessly or through any number of fixed/hardwired connections, networks, signals, protocols, formats, or so forth. In one embodiment, the smart phone 102 is a cell phone that communicates with the network 110 through a 5G connection. The laptop 106 may communicate with the network 112 through an Ethernet, Wi-Fi connection, cellular, or other wired or wireless connection.

The data 126 may be collected and sourced from any number of online and real-world sources including, but not limited to, clearinghouses (e.g., stocks, credit card transactions, etc.), website traffic and cookie-based analytics, social media and application data, point of sale, purchase, and transaction history, loyalty programs and coupons, payment services, location-based email list for mailers, surveys and questionnaires, and other applicable sources. The data 126 may be captured based on the permissions, authorization, and confirmation of the user. For example, the data 126 may include stock trading data, stock custody data, and consumer credit/debit card transaction data. The data 126 may also store information regarding a user's purchases (e.g., past, present, future, likely, etc.), interests (e.g., personal, commercial, etc.), business/business needs, and other applicable information. The data 126 may also store information regarding the family, friends, and associates of the user if authorized or requested by the user. As a result, the user may be able to support businesses and groups associated with friends and family as well by receiving targeted advertisements and potentially purchasing goods/services based on those advertisements.

These same data collection sources may be utilized to perform analysis of the data 126. In one embodiment, the data 126 may be captured through registered account information, programs/applications, website traffic, and tracking cookie-based analytics. For example, information, such as time spent on each site, page views, clicks, conversions, relevant content, trends, and other information may be recorded as part of the data 126. The data 126 may also include digital or online transactions performed through services, such as PayPal, Venmo, Zelle, Google, Square, WePay, Skrill, Payza, Stripe, Dwolla, Amazon Pay, 2checkout, and other similar services.

The data 126 may be captured through social media and applications. Social media data may be utilized to provide real-time polls, surveys, questionnaires, likes and dislikes, feedback, preferences for media content, site traffic, interests, and numerous other consumer data. Any number of mobile, computing, personal assistant (e.g., Siri, Alexa, Cortana, Google, etc.), or other applications may be utilized. Social media data may be utilized as definitive or anecdotal data.

The data 126 may also be captured through point of sale (POS) transactions, card transactions, in-person purchase, digital purchases, and purchase history. In one embodiment, a credit card clearing house may be utilized to capture the data. Customers, consumers, and clients may be comfortable with sharing the specific data points associated with point-of-sale transactions due to established practices. The point-of-sale transactions may include extensive data, including, but not limited to, name, address, item/service, price, credit card type, purchase location, date, brand preference, brand category, product affinity, spending levels, order history, inventory, restock data, purchase demographics, and so forth. Point-of-sale and transaction history data may have static, perennial, and influx data points with the value of each data point being tracked and measured within the data valuation index and the data derivatives marketplace.

The data 126 may also include location-based information and communications. An example of static and perennial data points that may be collected include a standard web form, email request form, wireless triangulation, routers/towers/access points reached, proximity beacons, and so forth. The location-based communications may capture data, such as email, consumer/business addresses, phone numbers, and so forth.

The data 126 may also include surveys and questionnaires. Responses to surveys and questionnaires may be one of the best ways to gather and inform information regarding the user's demographics, interests, and preferences that may not be able to be determined in other ways due to privacy, entity names, applicable laws, and so forth. The ability to gather real-world consumer insights may help complete or round out a user profile. The surveys and questionnaires may be performed digitally (e.g., websites, extensions, programs, applications, browsers, texting, or manually (e.g., audibly, on paper, etc.). Responses to surveys and questionnaires may help achieve saturation of datapoints for user profiles.

The cloud system 114 may aggregate, manage, analyze, and process data 126 and tokens across the Internet and any number of networks, sources 131, and third-party resources 130. For example, the networks 110, 112, 114 may represent any number of public, private, virtual, specialty (e.g., trading, financial, cryptocurrency, etc.), or other network types or configurations. The different components of the system 100, including the devices 101 may be configured to communicate using wireless communications, such as Bluetooth, Wi-Fi, or so forth. Alternatively, the devices 101 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 110, 112, 114 of the system 100 may represent a single communication service provider or multiple communications services providers.

The sources 131 may represent any number of clearing houses, web servers, service providers (e.g., trading platforms, credit card companies, transaction processors, etc.), distribution services (e.g., text, email, video, etc.), media servers, platforms, distribution devices, or so forth. In one embodiment, the sources 131 may represent the businesses that purchase, license, or utilize the data 126, such as advertising or marketing goods and services utilizing the system 100. In one embodiment, the cloud system 114 (or alternatively the cloud network) including the data platform 120 is specially configured to perform the illustrative embodiments and may be referred to as a system or platform.

The cloud system 114 or network represents a cloud computing environment and network utilized to aggregate, process, manage, generate, sell, monetize, and distribute data 126 and advertisements 129 while supporting the transactions 128 and utilization. The cloud system 114 may implement a blockchain system for managing the data 126, transactions 128, and advertisements 129. For example, any number of blockchain tokens may be utilized to manage the data and ensure proper compensation of the user. The cloud system 114 allows data 126, transactions 128, and advertisements 129 from multiple businesses, users, managers, or service providers to be centralized. In addition, the cloud system 114 may remotely manage configuration, software, and computation resources for the devices of the system 100, such as devices 101. The cloud system 114 may prevent unauthorized access to data 126, tools, and resources stored in the servers 116, databases 118, and any number of associated secured connections, virtual resources, modules, applications, components, devices, or so forth. In addition, a user may more quickly upload, aggregate, process, manage, view, and distribute data 126 (e.g., profiles, updates, surveys, content, etc.), transactions 128, and advertisements 129 where authorized, utilizing the cloud resources of the cloud system 114 and data platform 120.

The cloud system 114 allows the overall system 100 to be scalable for quickly adding and removing users, businesses, authorized sellers, interest-based information, transaction based information, analysis modules, distributors, valuation logic, algorithms, moderators, programs, scripts, filters, transaction processes, distribution partners, or other users, devices, processes, or resources. Communications with the cloud system 114 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 114 may include any number of load balancers. The load balancer is one or more devices configured to distribute the workload of processing the uploaded data 126 as well as applicable transactions to optimize resource utilization, throughput, and minimize response time and overload. For example, the load balancer may represent a multilayer switch, database load balancer, or a domain name system server. The load balancer may facilitate communications and functionality (e.g. database queries, read requests, write requests, command communications, stream processing, etc.) between the devices 101 and the cloud system 114. For example, the cloud system 114 may offload verification of users that seek to be added to the system 100 along with applicable data 126 and information. Load balancing may be performed between automatic systems and devices as well as individual users. Other intelligent network devices may also be utilized within the cloud system 114.

The servers 116 and databases 118 may represent a portion of the data platform 120. In one embodiment, the servers 116 may include a web server 117 utilized to provide a website, mobile applications, and user interface (e.g., user interface 107) for interfacing with numerous users. Information received by the web server 117 may be managed by the data platform 120 managing the servers 116 and associated databases 118. For example, the web server 117 may communicate with the database 118 to respond to read and write requests. For example, the servers 116 may include one or more servers dedicated to implementing and recording blockchain transactions and communications involving the data 126, transactions 128, and advertisements 129. For example, the databases 118 may store a digital ledger for updating information relating to the user's data 126 and transactions 128 as well as utilization of the data 126 and transactions 128 to generate and communicate the advertisements 129. For example, the user's data 126 may be packaged in digital tokens that may be securely communicated to any number of relevant parties.

The databases 118 may utilize any number of database architectures and database management systems (DBMS) as are known in the art. The databases 118 may store the content associated with each user/consumer/purchaser which may specify an address, name, age, demographics, interests, family/friend information, biometric identifiers, payment information, permissions, settings, location, cause preferences, cause restrictions, and so forth. Any number of secure identifiers, such as tones, QR codes, serial numbers, or so forth may be utilized to ensure that content, personal, or transaction information is not improperly shared or accessed. The databases 118 may include all or portions of a digital ledger applicable to one or more block chain transactions including token generation, management, exchange, and monetization.

The user interface 105 may be made available through the various devices 101 of the system 100. In one embodiment, the user interface 105 represents a graphical user interface, audio interface, or other interface that may be utilized to manage data, transactions, and other information. For example, the user may enter or update associated data utilizing the user interface 105 (e.g., browser or application on a mobile device). The user interface 105 may be presented based on execution of one or more applications, browsers, kernels, modules, scripts, operating systems, or specialized software that is executed by one of the respective devices 101.

The user interface 105 may display current and historical data as well as trends. The user interface 105 may be utilized to set the user preferences, parameters, and configurations of the devices 101 as well as upload and manage the data, content, and implementation preferences sent to the cloud system 114. The user interface 105 may also be utilized to communicate the advertisements 129 to the user. The devices 101 (e.g., displays, indicators/LEDs, speakers, vibration/tactile components, etc.) may present, play, display, or otherwise communicate the advertisements 129 visually, audibly, tactilely, or any combination thereof.

In one embodiment, the system 100 or the cloud system 114 may also include the data platform 120 which is one or more devices utilized to enable, initiate, generate, aggregate, analyze, process, and manage data 126, transactions 128, advertisements 129, and so forth with one or more communications or computing devices. The data platform 120 may include one or more devices networked to manage the cloud network and system 114. For example, the data platform 120 may include any number of servers, routers, switches, or advanced intelligent network devices. The data platform 120 may represent one or more web servers that perform the processes and methods herein described. The cloud system 114 may manage block chain management of the data 126 utilizing block chain technologies, such as tokens, digital ledgers, hash keys, instructions, and so forth.

In one embodiment, the logic engine 122 is the logic that controls various algorithms, programs, hardware, and software that interact to receive, aggregate, analyze, rank, process, score, communicate, and distribute data, content, transactions, alerts, reports, messages, or so forth. The logic engine 122 may utilize any number of thresholds, parameters, criteria, algorithms, instructions, or feedback to interact with users and interested parties and to perform other automated processes. In one embodiment, the logic engine 122 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 124 is a hardware element, device, or recording media configured to store data for subsequent retrieval or access at a later time. The memory 124 may be static or dynamic memory. The memory 124 may include a hard disk, random access memory, cache, removable media drive, mass storage, or configuration suitable as storage for data 126, transactions 128, instructions, and information. In one embodiment, the memory 124 and logic engine 122 may be integrated. The memory 124 may use any type of volatile or non-volatile storage techniques and mediums. In one embodiment, the memory 124 may store a digital ledger and tokens for implementing a blockchain processes.

In one embodiment, the cloud system 114 or the data platform 120 may coordinate the methods and processes described herein as well as software synchronization, communication, and processes. The third-party resources 130 may represent any number of human or electronic resources utilized by the cloud system 114 including, but not limited to, businesses, entities, organizations, individuals, government databases, private databases, web servers, research services, and so forth. For example, the third-party resources 130 may represent advertisement agencies, marketers, e-commerce companies, verification services, credit monitoring services, block chain services, payment providers/services, and others that pay for rights to use the data 126, track or provide information regarding the transactions 128, and create or monitor utilization of the advertisements 129.

In one embodiment, the data platform 120 may implement a blockchain ledger, manager, or technology. In another embodiment, the blockchain ledger may be accessible through sources 131. Any number of existing, developing, or future blockchain technologies, companies, or providers may be utilized (e.g., Aeternity, Ethereum, Bitcoin, Dfinity, ContentKid, Blockphase, Chain of Things, Flowchain, Decissio, Cognate, SkyHive, Safe, SALT Lending, Gemini, Circle, Coinbase, Chronicled, IBM, Voatz, Steem, Shipchain, etc.).

The blockchain is utilized as a way to store and communicate the data 126, transactions 128, and advertisements 129. The blockchain may utilized one or more distinct ledgers for different entities, services providers, types of data, users, or so forth. For example, each new user with data received by the data platform 120 is assigned a token or other secure identifier. In one embodiment, the digital tokens may be managed utilizing a key that allows the user or controlling party to access the ledger. In one example, the tokens may be controlled by the user or control may be reassigned. The blockchain may cross-reference updates to the data 126 with the original record for the data platform 120 to ensure proper maintenance, control, licensing, management, and transactions. In one example, different licensing tiers, pricing algorithms, license verification, cause information, and payments are combined to create a unique platform. The illustrative embodiments provide a system 100, cloud system 114, and data platform 120 for using user data, specifically stocks, equities, ownership, holdings, and interests, to generate selective or targeted advertising. The illustrative embodiments are performed based on the user's request, authorization, or approval to apply with all applicable laws.

The blockchain may also utilize any number of payment systems (e.g., PayPal, Venmo, Dwolla, Square, wire transfers, credit cards, Quicken, etc.) to receive money and distribute payments to the applicable party. In one embodiment, the data platform 120 may receive a small fee or percentage per transaction, data uploaded/updated, data purchased, shared, or licensed, purchased item, browsing session, or so forth. In one embodiment, the data platform 120 may be utilized to verify users and advertisers (as well as other users/entities that utilize the data platform 120) and associated data 126 and transactions 128 associated with the data 126.

The third-party resources 130 may represent any number of electronic or other resources that may be accessed to perform the processes herein described. For example, the third-party resources 130 may represent government, private, and charitable servers, databases, websites, programs, services, and so forth for verifying the data 126, transactions 128, and the advertisements 129. In another example, auditors may verify the advertisements 129 are actually generated based on the data 126 including the transactions 128.

Various data and venue owners that access the data platform 120 may legally extract and tokenize the data 128, transactions 128, and advertisements for use in the exchange provided by the system 100 by identifying and tracking data utilizing automatic data extraction tools. Any number of privacy and data policies may be implemented to ensure that applicable local, State, Federal, and International laws, standards, and practices are procedures are met.

In one embodiment, a user or consumer group represented by a user of the devices 101 or the sources 131 may elect and receive permission to collect observational data collected from secure and authorized systems to achieve access to partial or complete data from the sources 131 (e.g., professional drivers, human resources, prison records, property values, real estate sales, retail sales, retail prices, purchase data, stock ownership, commerce, waste stream data, etc.).

The logic engine 122 may also perform valuation of the data 126 and advertisements as is taught by U.S. provisional patent application 62/755,815 entitled "Method and System for Data Valuation and Secure Commercial Monetization Platform" and filed Nov. 5, 2018 and corresponding PCT/US19/59920 filed Nov. 5, 2019 and as is taught by U.S. provisional patent application 62/826,457 entitled "Method and System for Data Futures Platform" filed Mar. 29, 2019 and corresponding PCT/US20/25495 filed Mar. 27, 2020 which are hereby incorporated by reference in their entirety. The illustrative embodiments may also support third-party utilization of the data 126 and transactions 128 to generate the advertisements 129. Various authorization, auditing, and validation processes may be performed by auditing groups, commissions, industry groups, or other professionals/entities. The various embodiments may also allow a user to donate the value of their data 126 and transactions 128 and consumption of advertisements 129.

In one embodiment, the logic engine 122 may utilize artificial intelligence. The artificial intelligence may be utilized to enhance data 126, analyze transactions 128, and generate advertisements 129 to increase value, utilization, effectiveness, and profits. For example, artificial intelligence may be utilized to review, authenticate, and validate data and transactions that are received by the system 100. The artificial intelligence of the logic engine 122 may be utilized to ensure that the data 126 is improved, accurately analyzed, and value increased. For example, it is expected that data and the associated tokens that are validated utilizing artificial intelligence may be given a premium value by advertisers.

In another embodiment, the devices 101 may include any number of sensors, appliances, and devices that utilize real time measurements and data collection to update the data 126. For example, a sensor network, wearables (e.g., watches, bands, implantable devices, etc.) and Internet of things (IoT) devices may gather user and behavioral data. The data platform 120 may also work in conjunction with hands-free data mining and measurement tools that tracks location, activity, and video-based marketing data (e.g., from GPS location, video from storefronts, beacon detection, proximity alerts, etc.) from any number of third-party sources. The user may be tracked through any number of environments, locations, and conditions. The advertisements 129 may also be generated based on the activities, actions, and location of the user.

In one embodiment, the data platform 120 may extract data from third-party platforms by opting in and providing user credentials to various applications (e.g., Charles Schwab, TD Ameritrade, E*Trade, Vanguard, Fidelity, Merrill Lynch, etc.) the data platform 120 may extract data from the sources 131.

Figure 2:
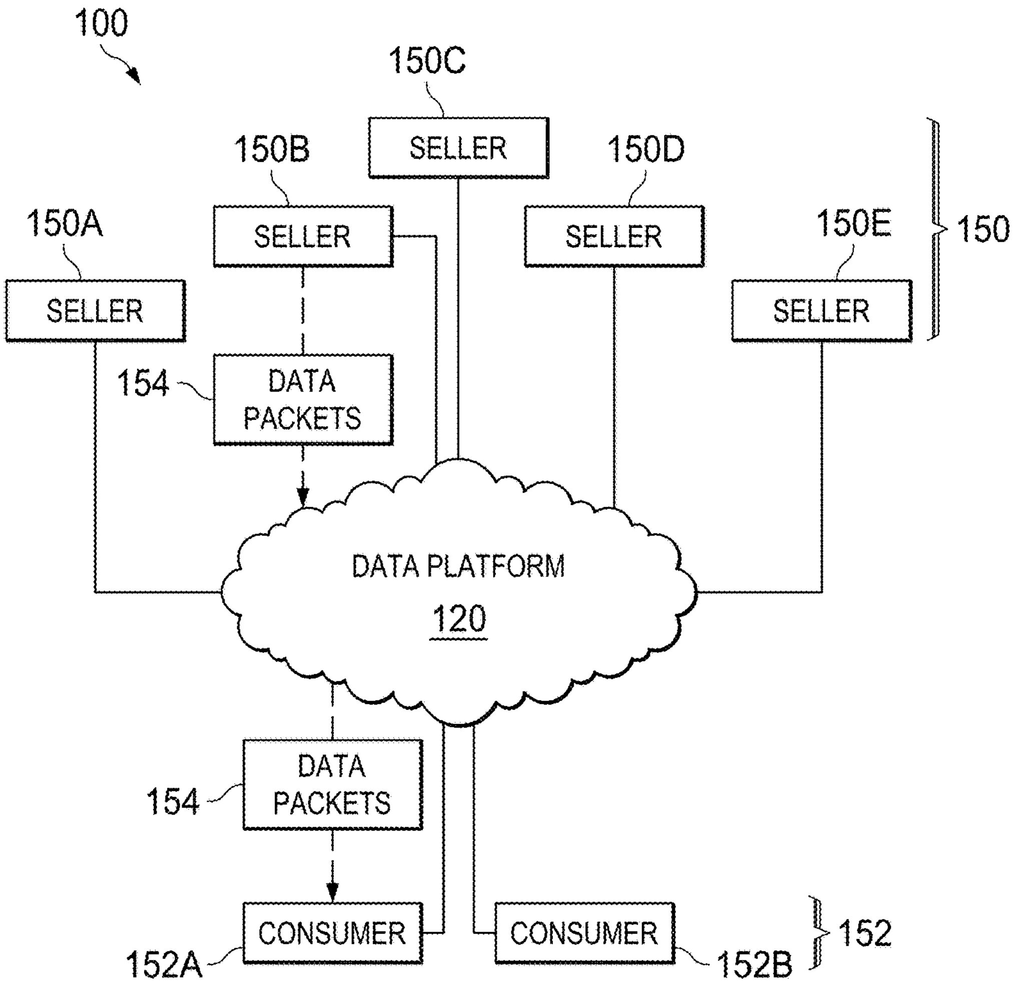
FIG. 2 further illustrates portions of the system of FIG. 1 in accordance with an illustrative embodiment.

FIG. 2 further illustrates portions of the system 100 of FIG. 1 in accordance with an illustrative embodiment. As shown the advertisers 150A-E (jointly advertisers 150) may represent the sources 131 of FIG. 1. The sellers 150 may represent any number of exchanges, platforms, clearing-houses. advertisers, marketers, businesses, retailers, service providers, individuals, organizations, entities, or so forth referred to as sellers 150 or businesses for purposes of simplicity. The consumers 152A, 152B (jointly consumers 152) represent any number of users, consumers, groups, or individuals that have data 154 (also including transactions) that is utilized to allow targeted advertisements 155 to that they are willing to allow the sellers 150 to access through the data platform 120. In one embodiment, the data platform 120 may represent all or portions of the system 100 of FIG. 1 (including the cloud system 114, servers 116, and databases 118).

The consumers 152 may actively or passively upload data 154 to the data platform 120. The data platform 120 may also receive amended, updated, or add additional data 154 for the consumers 152 at any time as described herein. The consumers 152 may have an agreement (e.g., contract, terms of services, permissions, authorizations, etc.) for the utilization of the data 154 by the sellers 150 or other interested parties to generate the targeted advertisements 155. The agreement or contract may specify how, when, and what portions of the data 154 may be used as well as the associated compensation terms. The agreement may specify that the data 154 may be processed, analyzed, purchased, licensed, rented, leased, or otherwise managed by the data platform 120 for the mutual benefit of the consumers 152 and the sellers 150. For example, the consumer 152B may elect to receive targeted advertisements 154 to support the companies, organizations, entities, or other groups in which the consumer 152B has stock, ownership shares, interests, holdings, or a vested interest. The consumer 152B may be interested in the targeted advertisements 154 to support herself or to support family and friends. In another example, the consumer 152B may elect to license use of their data 154 such that they are compensated utilizing a digital currency (or hard currency) for each access of or utilization of their data 154 by the sellers 150.

The data platform 120 may process raw consumer data to generate the targeted advertisements 155. The targeted advertisements 155 may be desirable to the user because the targeted advertisements 155 support the companies, stock, holdings, ownership, or interests of the user. In one embodiment, a term or logo utilized with each of the advertisements may indicate that the targeted advertisements are for the benefit of the user. In one embodiment, the targeted advertisement 155 may even include the stock ticker, name of the company, user's name, key word, identifier, certification, or so forth indicating that the targeted advertisement has gone through the analysis, authorization, and vetting process herein described.

The data platform 120 performs valuation of the data 154 and targeted advertisements 155 based on information from any number of sources including current rates, contracts, indices, exchanges, and other applicable information. For example, current targeted advertisement rates may be utilized to value the data. The tokens paid to the consumers 152 in exchange for the data 154 may vary based on the volume, quantity, verification, and types of information included in the data 154. The data platform 120 normalizes data monetization for the consumers 152 and sellers 150. Compensation performed by the data platform 120 may be performed utilizing digital currencies or hard currencies. In one embodiment, blockchain-based currencies may be utilized to compensate the consumers 152. Full tokens or partial tokens may be utilized to represent the values most accurately being exchanged. There may be a predefined number of tokens available thereby allowing early adopters of the system 100 to earn more over time. For example, in response to the consumer 152A selling or granting access to the data 154 to the data platform 120 or the seller 150B, the consumer may be compensated with tokens (e.g., Bitcoin, Ethereum, proprietary tokens, etc.). All or portions of the data 154 may be involved in a transaction. For example, in addition to stock, ownership, equities, and interest, the data 154 may include numerous components relating to all aspects of the life, work, hobbies, entertainment, studies, politics, health, family, consumer habits, for the consumer 152B. Not all of the sellers 150 may sell products, goods, or services that correspond to the stocks, holdings, and interests of the consumers 150. The seller 150D may only license rights to temporarily (e.g., for a single session, activity, timer period-day, week, year, or custom amount) access the consumer habits of the consumer 152B existing and updated in real-time. The exchange for the tokens may include a pointer to a secure storage or vault accessed through the data platform 120. The pointer may be an encryption key, access information, unique identifier, or other security information for accessing the data 154 associated with the user. In another embodiment, security tokens used for the blockchain may also be embedded with the data 154. The tokens granted through the data platform 120 may vary in value, may be fixed, or may act similar to other monetary instruments (e.g., stocks, bonds, certificates of deposit, etc.) for a specified original value of the data 154.

The data platform 120, sellers 150, or consumers 152 may keep and maintain digital ledgers that track the transactions within the system 100 to verify and authenticate the data 154, advertisements 155, and associated transactions. The sellers 150 may utilize the data 154 to advertise, sell, or market goods, services, products, perform market research, generate analytics, and otherwise generate and communicate the advertisements 155 and communicate the advertisements 155 to the consumers 152. As previously noted, the data platform 120 may also represent one or more processing, analysis, blockchain, or distribution centers, systems, devices, facilities, or so forth. The sellers 150 and consumers 152 may represent any number of individuals or groups (e.g., hundreds, thousands, millions, etc.).

As noted, the sellers 150 may send or distribute goods and services associated with the advertisements 155 through the cloud system or directly to the consumers 152. In one embodiment, the seller 150B may distribute goods and services 154 to the consumer 152A through the data platform 120. The data platform 120 may perform distribution of the goods and services 154. For example, the data platform 120 may include any number of physical storages, digital storage, warehousing, and distribution systems, facilities, professionals, employees, contractors, electronics, and so forth.

The data platform 120 is unique in the way that data is tracked and utilized. Existing systems do not allow a user to control how and when their data is utilized. Most users are unable to monetize their data as it is utilized by search companies, social media companies, online retailers, and others. The platform and implemented methods provides a unique and transparent manner to track data of a user and utilize the data. The interactions between consumers 152 and the sellers 150 through the data platform 120 is unique and mutually beneficial. The illustrative embodiments provide the system for better tracking data (e.g., data packets 154) that may be subsequently utilized to update advertisements and marketing that is presented to the consumers 152 by the sellers 150 (or other parties).

The system 100 and data platform 120 may be a unique portion of a block chain system that enables for user data to be securely accessed through tokens that may be created, modified, vended, and otherwise transacted.

Figure 3:
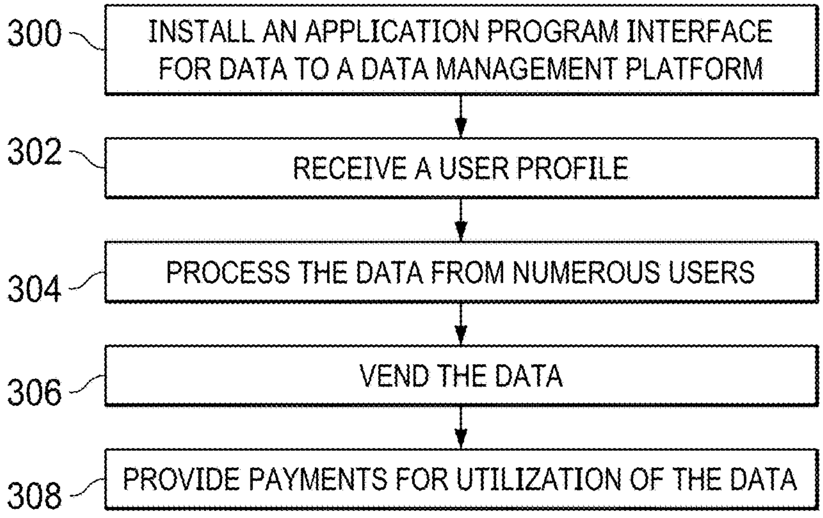
FIG. 3 is a flowchart of a process for vending data in accordance with an illustrative embodiment.

FIG. 3 is a flowchart of a process for vending data in accordance with an illustrative embodiment. The process of FIGS. 3-7 may be performed by a platform, device, server, or other equipment in accordance with illustrative embodiments (see for example the devices, servers, systems, and equipment of FIG. 1). All or portions of the steps or processes of FIGS. 3-7 may be performed automatically. The process of FIG. 3 may be implemented by a system or platform, such as the system 100, data platform 120, or devices 101 of FIG. 1 referred to generically herein as the platform. The steps of FIGS. 3-7 as well as the systems, devices, and components of FIGS. 1, 2, 8, and 9 may be combined in any order, integrated, or otherwise combined as useful.

The process of FIG. 3 may begin by installing an application program interface for data to a data management platform (step 300). The application program interface (API) may be installed or integrated with any number of platforms, programs, or so forth. The API may also be any number of software programs, scripts, modules, sets of instructions, or so forth. In one embodiment, the API is integrated with a web browser as an add-in, extension, or other interface. For example, the API may be integrated with a search tool (e.g., standalone, browser-based, network managed, etc.). The API may be utilized by individuals, corporations, data exchange companies to enhance their data protection and data management and monetization strategy. The illustrative embodiments are an improvement over existing technologies because they provide user control of personal and online data for the purpose of monetization by the data owners.

Next, the system receives a user profile (step 302). The user profile may represent an individual, family, group of individuals (e.g., friends, clubs, associates, etc.), company, organization, or entity and may be referred to generally as a "user profile" or "data profile." For example, a user profile may be created for a user. The data profile may also include user preferences, settings, parameters, and other applicable information that control what, when, and how data may be collected, shared, and monetized. The user profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data.

Next, the system processes the data from numerous users (step 304). The data may be processed by adding, confirming, modifying, reconfirming, and authorizing data according to the user profile. In one embodiment, raw data may be converted into data objects. For example, user purchases may be created to specify that the user has children 10, 12, and 16 with interests in specified sports, gaming, mobile devices, and camping. The illustrative embodiments may utilize artificial intelligence or machine learning to perform processing and segmentation of the data during the data collection process. The data may be raw, partially processed, structured, or unstructured as utilized and monetized. The data herein described may be transformed from raw data into data objects, sets, and profiles tied to real world and digital assets.

In one embodiment, during step 304, the data may be associated with a unique security token that points to or includes the data. The data may include new, added, modified, or updated user data or profile objects, such as consumer interest, sharing of personal plans, likes and dislikes, opinions, social media feeds, purchases, preferred retailers, products and services of interest, and other similar information.

Next, the system vends the data (step 306). The tokens may grant access to the data. Full or partial tokens may be included in transactions. The tokens may be involved in transactions by advertisers, brands, corporations, and any entity who values or requires access to data to enhance their brand reached. Tokens may be passed from these parties to consumers/users in exchange for access to their data. The tokens may be distributed each time a user associated with a data object participates in sharing, updating, exchanging, or selling the data. The illustrative embodiments provide the ability to band multiple variable priced micro fractions of tokens for each single or new data point/object. The platform may also band a single higher value token to represent and monetize a large exchange of data (e.g., objects, sets, profiles, pool(s), etc.).

Next, the system provides payment for utilization of the data (step 308). The system may track the fluctuating value of the data points, sets, and pools (all referred to as "data"). The system may ensure that users receive optimal compensation and monetization of their data. User may be paid in hard currency (e.g., American Dollars, British Pounds, Mexican Pesos, etc.), digital currency, discounts, services, rebates, or so forth. The purchasers of the tokens/and associated data may offer users micro fractions of a tokens market value in exchange for access to advertiser desired data profile elements. The described systems and methods allow data to be monetized even if not fully utilized by the user (e.g., company, individual, entity, etc.). As a result, the user may be able to create new or enhanced revenue streams from latent data that may be collected as a byproduct of their business. The illustrative embodiments may provide a method of utilizing data that satisfies user, legal/privacy, and industry standards as well as securing the data against unwanted access or intrusions.

Figure 4:
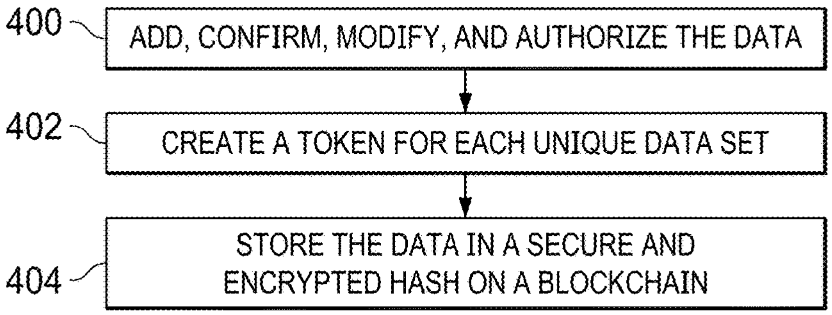
FIG. 4 is a flowchart of a process for storing data in accordance with an illustrative embodiment.

FIG. 4 is a flowchart of a process for storing data in accordance with an illustrative embodiment. The process of FIG. 4 may begin by adding, confirming, modifying, and authorizing the data (step 400). At anytime different data objects may be added. The data may be added as individual elements, sets, profiles, and pools. The platform may be added, confirmed, modified, and authorized as structured or unstructured data.

Next, the system creates a token for each unique data set (step 402). The tokens may point to a single data object/element, data sets, data profiles, or data pools. The illustrative embodiments allow for the tokenization of a real-world or digital asset for the purpose of implementing micro-fraction ownership of the corresponding asset. The tokens may then be involved in any number of transactions involving numerous parties.

Next, the system stores the data in a secure and encrypted hash on a block chain (step 404). In one embodiment, an encrypted hash on the blockchain may be utilized to store the data (e.g., data objects, data sets, data pools, etc.). Although reference is made to utilizing a block chain system, the illustrative embodiments may also utilize other secure storage techniques, such as encrypted databases, secured servers, and so forth.

Figure 5:
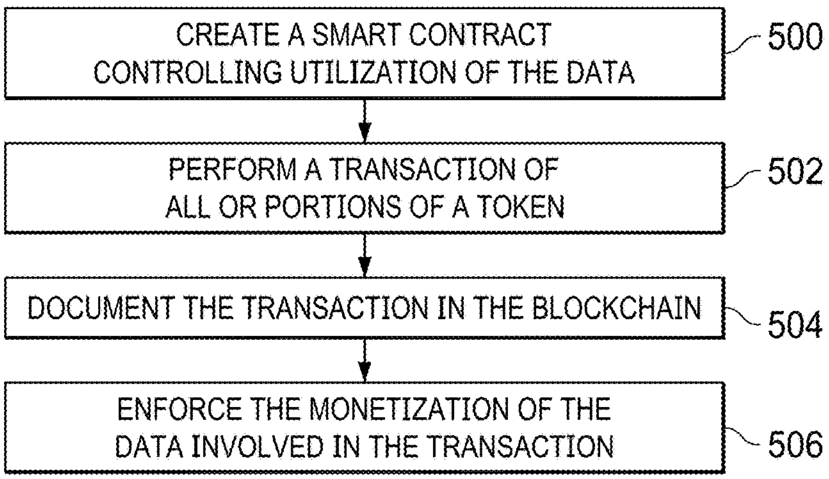
FIG. 5 is a flowchart of a process for monetizing data in accordance with an illustrative embodiment.

FIG. 5 is a flowchart of a process for monetizing data in accordance with an illustrative embodiment. The process of FIG. 5 may begin by creating a smart contract controlling utilization of the data (step 500). The smart contract may be created based on the requirements of the user and potential purchasers (e.g., advertisers, corporations, etc.). The smart contract governs how the user is compensated for transactions involving the data. The smart contract may also specify the rights granted to a token holder. The legal rights, permissions, binding terms, and other information may be specified by the smart contract. In one embodiment, the smart contract controls how the data is utilized and monetized. The price of the data may be governed by free market valuations. Alternatively, the smart contract may set price maximums and minimums. In one embodiment, the smart contract may allow for the geographic utilization of the data. For example, the data may be of value for location-based targeting to interested parties (e.g., neighborhood, region, city, state, etc.).

Next, the system performs a transaction of all or portions of a token (step 502). The platform may include or represent an exchange. As noted, full tokens or partial tokens of any size may be involved in transactions. For example, fractional or micro share of the tokens may be involved in the transactions. The purchase or exchange of tokens may provide a party access to the data associated with the token. Transactions may be performed through the system that measures and values the tokens, data, and other transaction components in real-time. The transaction may include any number of market, limit, stop, short, option, or futures transactions or orders. For example, the transaction may be performed based on a price that is predetermined or determined in real-time or determined at the time of transaction of the data from the seller to purchaser.

Next, the system documents the transaction in the block chain (step 504). In one embodiment, the transaction may be recorded on the ledger associated with the block chain. The transaction may also be recorded utilizing any number of databases or so forth.

Next, the system enforces the monetization of the data involved in the transaction (step 506). In one embodiment, the monetization of the data and associated transaction involved in the transaction may be governed by the smart contract.

Figure 6:
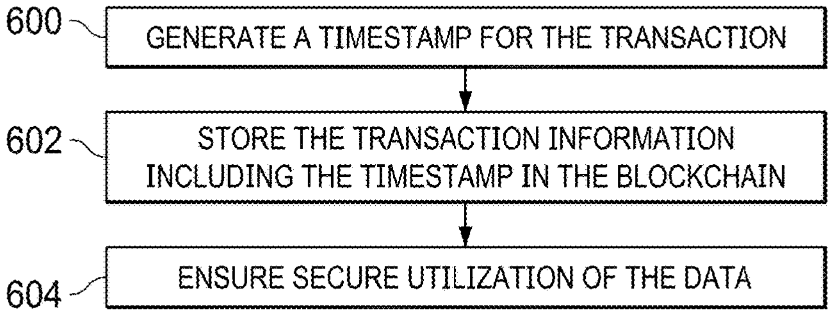
FIG. 6 is a flowchart of a process for documenting a transaction in accordance with an illustrative embodiment.

FIG. 6 is a flowchart of a process for documenting a transaction in accordance with an illustrative embodiment. The process of FIG. 6 may begin by generating a timestamp for the transaction (step 600). The transaction may be timestamped utilizing any number of standards. In one embodiment, the transaction is marked in a blockchain logo in Unix/Epoch time which is the time 00:00:00 UTC on Jan.

1, 1970 minus leap seconds. An Epoch timestamp may provide a universal time stamp that is searchable, accessible, readable, and recognizable across locations, time zones, and so forth. Accurate time keeping is required to ensure that transactions are properly documented to ensure accurate valuations, ownership, transactions, and monetization of the tokens and associated data. For example, the utilization of Epoch/Unix timestamps may allow for greater reliability when retrieving a datapoint associated with the transaction.

Next, the system stores the transaction information including the timestamp in the block chain (step 602). As part of this process, a new block of information may be added/chained together. For example, once new data comes in the data is entered into a fresh block. Once the block is filled with data it is changed on the previous block, which makes the data chained together in chronological order.

Next, the system ensures secure utilization of the data (step 604). The data may be accessed utilizing a key or identifier included in the token. As previously noted, the data may be de-identified or disassociated from the user to prevent identity theft, hacking, or any other unwanted usage of the user's data.

The illustrative embodiments may be utilized to create corporate and consumer data estates. Corporation, entity, group, family, or user may be tokenized as a data estate. The data grouping of the estate may include each data profile element with a single profile and corporation data profile, groups of data profiles, and token-based micro shares tied to data points, data objects, data sets, data pools, and data estates. Artificial intelligence may be utilized to verify the data is current and complete. The single and groups of data profiles may be ranked by value and desirability. Data estates may be similarly involved in transactions and monetized as is herein described.

The decentralized nature of the illustrative embodiments including utilization of block chain technology may allow any currency to be exchanged for access to data. As a result, the existing pay per click (PPC), pay per view (PPV), cookie targeting, or other existing models may become obsolete. Many of these blind targeted advertising models are ineffective and costly to corporations or groups that purchase or access the data. The illustrative embodiments focus on data completeness by motivating users to provide accurate and real time data for enhanced value to advertisers. As a result, many of the best guess, blind, or implied processes are not optimally utilized for ad generation and targeting. The value provided by the data refinery, data vault, and data exchange may lead to higher conversion rates over standard advertising and marketing campaigns that utilize generic digital format website advertisements.

The data valuation and monetization system and methods herein described are also disruptive because they give profile owners visibility and control over which companies, groups, entities, or individuals are authorized to access their data and which parties are blocked access. For example, a white list and a blacklist may be utilized to specify the parties that have full, limited, or no access to the data. As a result, block parties are prevented from participating in any transactions for tokens/data for which they are unauthorized.

The illustrative embodiments allow for the reduction or click-fraud events, wasted advertisements, and reduce the need to monitor ad network traffic for indications of bot or other fraudulent mechanisms used to falsely imply higher web traffic numbers, ad-clicks and ad-views on advertisements or targeted content further ensuring internet activity and consumer responsiveness to advertisements are genuine.

The illustrative embodiments also provide a platform for users to securely store their data in a data value that obscures unwanted access to their data. For example, the identifying information for the user may be disassociated from their data and profile. As a result, user profiles and data may be more freely shared with approved advertisers, brands, marketers, and others and lessens the need for those parties to focus revenue on blind and behavioral targeting that historically has exceptionally low conversion rates.

The illustrative embodiments provide a methodology to define and value user data by measuring user engagement and data verification, date profile completeness, profile data point saturation, data point marketability, data point desirability and market specific data. The platform may also indicate that specific data has become less or more desirable and may indicate when data is static, non-static, ever changing or perennial, or less desirable through the utilization of the data platform and data marketplace.

In the illustrative embodiments, token purchases and payouts may be documented in Smart contracts. The Smart contracts may be executed by users and parties (e.g., advertisers, marketers, analysts, researchers, etc.) who trade access to the data for a full or partial share of the token. Tokens may be exchanged between parties based on needs and desires. The data may be valued based on how often it is updated, modified, verified, and based on overall completeness.

Figure 7:
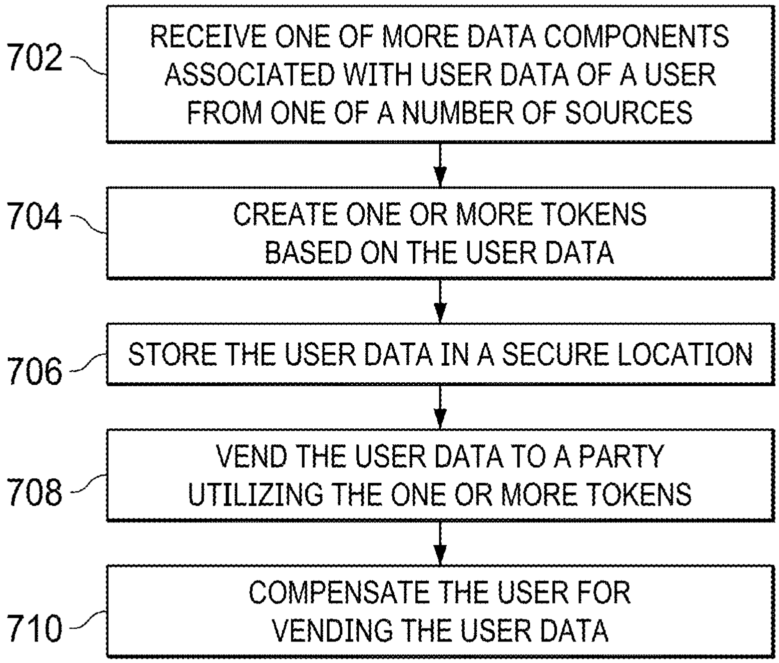
FIG. 7 is a pictorial representation of a platform for monetizing data in accordance with an illustrative embodiment.

FIG. 7 is a flowchart of a process for monetizing data in accordance with an illustrative embodiment. As previously described, the process may be performed by a special platform, system, device, equipment, or component. The process of FIG. 7 may begin by receiving one or more data components associated with user data of a user from one of a number of sources (step 702). The data components may represent various types of data, numbers, profiles, or other information associated with the user. The data component may also be referred to as data elements. The reference to the data components in FIG. 3 may represent one or more data components that are received in a session, simultaneously, sequentially, or concurrently. The data components may be received through any number of processes, devices, platforms, or so forth. For example, the data elements may be received through online, application, or electronic purchases, video selections, point-of-sale, foot traffic, location, surveys, social media selections, web consumption and history, audio input, or devices, such as wireless devices, personal computers, e-books, digital assistants, vehicles, gaming devices, virtual/augmented reality systems, or so forth. The platform may also confirm the data component is applicable to the user and/or verifiably received from the user. In one example, as data is received, the user may ask a verification question, such as "is this Blair?" The platform may also utilize machine learning to recognize activities, programs, and behavior associated with each of a number of users that may utilize the electronic devices that are part of or in communication with the platform. The platform may also receive specific user input to confirm that data belongs to the user or originated from the user or their authorized activities. For example, the user may verify that the data component is accurate and resulted from actions, activities, selections (active or passive), opt ins, surveys, codes/passwords/pins, biometric recognition, feedback, or data of the user. In another example, the user may determine that the data component was not received utilizing approved methods or processes. As a result, the data component may be deleted or otherwise removed. The data component may not be incorporated into a larger data set or a data profile associated with the user. The user maintains control over their data and how it is captured, managed, monetized, and otherwise utilized by themselves and third parties. Incomplete data sets may be completed as needed.

Next, the platform creates on or more tokens based on the user data (step 704). In one embodiment, the token includes an indicator, such as a secure link, instructions, algorithm, key, secure identifier, or pointer that points to the user data. The indicator may also grant access to the holder/recipient to access the user data securely as an authorized party. In another embodiment, the token itself may include the user data. In other embodiments, a portion of the user data that is less personal may be included in the token and additional user data that is more personal may be linked to by the token.

Next, the platform stores the user data in a secure location (step 706). As noted, the user data may be stored with or separately from the one or more tokens. The user data may be stored in a secure server and/or database accessible through one or more networks. For example, a secure connection (e.g., virtual private network connection, encrypted connection, secure accounts, etc.) may be utilized between devices or systems to ensure the safe communication of the one or more tokens, user data, and other applicable information.

Next, the platform vends the user data to a party utilizing the one or more tokens (step 708). The party may represent one of a number of parties that have purchased, leased, rented, licensed, or otherwise legally acquired access to the one or more tokens and associated data. During step 708, the token may be transferred or access may be granted. As previously noted, the user data may be made available to the party from the secure location utilizing an indicator included in the one or more tokens.

In another embodiment, the platform or a separate device may generate an advertisement in response to the user data. The advertisement may be generated in behalf of the party based on step 708. The advertisement may represent a physical, digital/electronic, temporary, remote display (e.g., billboard, store sign, etc.) or other advertisement, marketing, or information that may be presented to the user audibly, visually, tactilely, or through other techniques. For example, digital advertisements may be displayed through mobile applications, computer programs (e.g., browsers, search tools, etc.), or other mediums. The advertisements may also be displayed based on proximity.

Next, the platform compensates the user for vending the user data (step 710). In one embodiment, during step 710, the party may purchase the data or otherwise compensate a service provider, vending party, or user associated with the data. Any number of tracking processes may be utilized to ensure that all transactions are processed with money, currency (e.g., digital currency, physical currency, electronic currency, etc.) being exchanged or transacted. The user may be compensated based on a preset time period (e.g., day, week, month, year, etc.). The service provider, aggregator, intermediaries, or other parties may also be compensated as part of the process of step 710. The platform monetizes the data to ensure that the user is compensated for the receipt, analysis, processing, and utilization of the data. As previously noted, the user may elect not to receive earnings, payments, or the monetary benefit of the data being monetized. For example, the earnings (e.g., dollars, crypto the, points, credit, discounts, etc.) may be donated, shared, or otherwise distributed to charitable groups, organizations and individuals, and so forth.

The process of FIGS. 3-7 may be performed automatically by algorithms, programs, or instructions configured to determine the validity and authenticity of data components. The user may specify preferences for controlling how and when the data is utilized. For example, a granular level of authorization may include individual applications, companies, organizations, entities, and others permissions regarding who may access the data.

Any number of preparatory steps may be performed as part of the processes of FIGS. 3-7. For example, a user profile may be created for a user. The user profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data.

Figure 8:
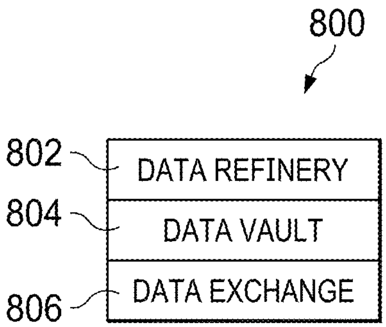
FIG. 8 is a pictorial representation of a platform 800 for monetizing data in accordance with an illustrative embodiment.

FIG. 8 is a pictorial representation of a platform 800 for monetizing data in accordance with an illustrative embodiment. The platform 800 may include a data refinery 802, a data vault 804, and a data exchange 806. The platform 800 of FIG. 8 may be representative of one or more devices, such as the servers 116, data platform of FIG. 1, or other smart networked device implementing specific hardware, software, firmware, and/or sets of instructions. The platform 800 including the data refinery 802, data vault 804, and the data exchange 806 may function as separate platforms or an integrated platform.

The data refinery 802 is utilized to create data objects and capture applicable data to include the data objects. In one embodiment, the data refinery 802 may be positioned within the user's existing system to capture data that is already received, entered, gleaned, or otherwise determined by the existing system. The data object may be created to store all, portions, or types of data associated with the user (e.g., individual, couple, family, company, organization, group, entity, etc.).

The data vault 804 is utilized to securely store the data objects and add, modify, and improve the associated data. In one embodiment, the data vault may be utilized to collect, characterize, and value the data. The data vault 804 may also determine the pace at which new data objects are added or updated as well as the types of data. For example, the data vault 804 may determine that information relevant to two of the user's clients including company preferences for wireless services and legal services are added to the data vault 804 each day. The data vault 804 may be a physical or virtual storage and vault that securely stores information. In one embodiment, the data objects may be deidentified to remove identifying information to prevent hacking, identity theft, and other unwanted or prohibited utilization of data. The data vault 804 may also assign an initial value for the data object. The value may be associated with similar data, going rates, completeness of the data, the type of data, the user supplying the data, historical information, and so forth. The value may change at any time based on a determination of the platform 804 (i.e., the data vault or data exchange).

The data exchange 806 is utilized to price and perform transactions for the data objects. In one embodiment, the data exchange 806 creates a ticker associated with the data object. The ticker may be associated with the data object(s) for a user. The data exchange 806 allows the data objects to be priced and purchased. In one embodiment, exchange may utilize secure tokens to access the data. For example, transactions involving the data may represent a key for accessing the purchased or leased data. For example, the tokens may include an encryption key, password, biometric, or other secure identifier for accessing the data object from the data vault or other stored location.

The platform may perform data reconciliation of the information at any time during the process. In one embodiment, a data reconciliation engine may review the applicable information to determine products/services that align with the data and interests of the user. In one embodiment, the platform may determine a portfolio of potential advertisements for goods and services associated with the user's data or interests. As a result, the advertisements may be readily available in real-time or near real-time.

Likewise, at any time the platform may create targeted advertisements based on the user data. The targeted advertisements or marketing may represent any number of advertisements displayed to the user including Internet advertisements, in-application advertisements, television/video/Internet Protocol Television advertisements, radio/Internet radio, print advertisements, and other forms of advertisements and marketing.

In one embodiment, advertising and marketing may be directed toward the user in response to a selection made by the user to opt-in to targeted advertisements that benefit the user's interests rather than random or blind targeted advertisements. For example, the selection may involve the acceptance of financial or legal language utilizing a graphical user interface presented utilizing a web interface, mobile application, or so forth. The selection may be to receive targeted advertisements rather than generic advertisements or advertisements that are not associated with the user's data and interests. In one embodiment, a profile associated with the platform may specify the companies, organizations, entities, or other groups that the user would like to support. The user's profile may also include any number of settings, configurations, parameters, selections, releases, authorizations, verification requirements, or other information and data that controls how the user's data is utilized in accordance with the illustrative embodiments. The user referenced herein may also refer to one or more individuals, a group of people, an entity, an organization, associated persons, or so forth. The data may also be referred to as personal data, consumer data, private data, monetized data, authorized data, advertising data, or marketing data and may include individual data units, data sets, data pools, and other amalgamations or compilations of data, values, and information. The illustrative embodiments utilize blockchain and tokens because of the need for enhanced confidentiality and performance of data transactions.

The illustrative embodiments allow blocks of user data, vending data, transaction data, and other data and information described herein to be stored across a blockchain system, platform, or network. There is no single point of control or failure. User's data is secured so that access and utilization results in compensation directly or indirectly to the user in a way that has not happened before. The user, service providers, sellers, intermediaries, exchanges, platforms, managers, and/or other parties or devices may perform create, read, update, and delete operations on the data with an audit trail of the user data and utilization being tracked. As a result, validation and reconciliation of all portions of the process may be performed effectively.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible or non-transitory medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical or other form of propagated signal (e.g., carrier waves, infrared signals, digital signals, etc.), or wireline, wireless, or other communications mediums.

Computer program code for carrying out operations of the embodiments may be written in any combination of one or more programming languages, including an object-oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

Figure 9:
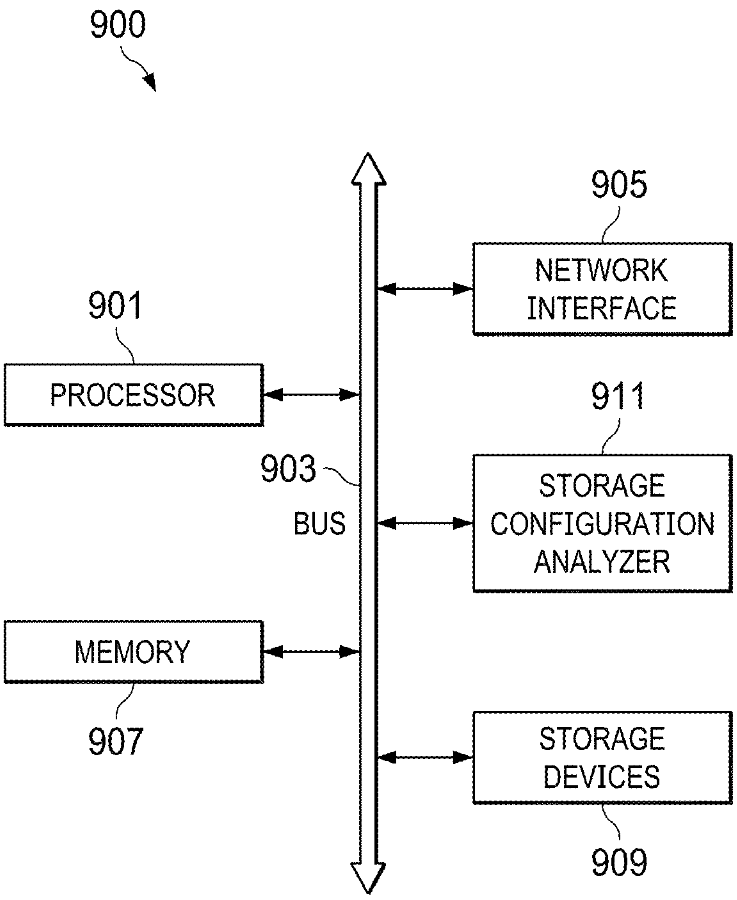
FIG. 9 depicts a computing system in accordance with an illustrative embodiment.

FIG. 9 depicts a computing system 900 in accordance with an illustrative embodiment. For example, the computing system 900 may represent a device, such as one or more of the devices 101 of FIG. 1. The computing system 900 includes a processor unit 901 (possibly including multiple processors, multiple cores, multiple nodes, and/or implementing multi-threading, etc.). The computing system includes memory 907. The memory 907 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 903 (e.g., PCI, ISA, PCI-Express, HyperTransport®, InfiniBand®, NuBus, etc.), a network interface 905 (e.g., an ATM interface, an Ethernet interface, a Frame Relay interface, SONET interface, wireless interface, etc.), and a storage device(s) 909 (e.g., optical storage, magnetic storage, etc.). The system memory 907 embodies functionality to implement embodiments described above. The system memory 907 may include one or more functionalities that store content, blockchain data, parameters, application, user profiles, and so forth. Code may be implemented in any of the other devices of the computing system 900. Any one of these functionalities may be partially (or entirely) implemented in hardware and/or on the processing unit 901. For example, the functionality may be implemented with an application specific integrated circuit, in logic implemented in the processing unit 901, in a co-processor on a peripheral device or card, etc. Further, realizations may include fewer or additional components not illustrated in FIG. 9 (e.g., video cards, audio cards, additional network interfaces, peripheral devices, etc.). The processor unit 901, the storage device(s) 909, and the network interface 905 are coupled to the bus 903. Although illustrated as being coupled to the bus 903, the memory 907 may be coupled to the processor unit 901.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes or methods of the invention. It is understood that any other modifications, substitutions, and/or additions may be made, which are within the intended spirit and scope of the disclosure. For the foregoing, it can be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

What is claimed is:

1. A method for monetizing user data utilizing a data platform, comprising:

receiving user preferences through a secure user interface of the data platform for managing the user data in the data platform;

automatically capturing the user data from a plurality of sources according to the user preferences utilizing the data platform, wherein the data platform periodically scans the plurality of sources and encrypts the user data that is captured;

tokenizing the user data in one or more blockchain tokens utilizing the data platform;

monetizing the user data in accordance with the user preferences; and compensating the user for monetizing the user data as tracked by a distributed ledger, wherein payments to the user are executed by the data platform.

2. The method of claim 1, wherein monetizing further comprises:

vending the one or more blockchain tokens.

3. The method of claim 1, wherein the user data includes one or more data elements.

4. The method of claim 3, wherein the user data is automatically captured in response to receiving initial data elements including the one or more data elements, modifying the one or more data elements, updating the one or more data elements, and verifying the one or more data elements.

5. The method of claim 1, wherein the user preferences include permissions for capturing, utilizing, and monetizing the user data.

6. The method of claim 1, wherein the user data is stored in the one or more blockchain tokens.

7. The method of claim 1, wherein the user data is stored in a secure location associated with the data platform and accessible utilizing an indicator included in the one or more blockchain tokens.

8. The method of claim 1, wherein a blockchain token is created for each unique data set associated with the user data.

9. The method of claim 1, further comprising:

creating a smart contract utilizing the user preferences controlling utilization of the user data.

10. The method of claim 1, wherein monetizing further comprises:

receiving payments from one of a plurality of parties to access the user data utilizing the one or more blockchain tokens.

11. A system for monetizing user data, comprising:

a plurality of electronic devices executing a data application, the data application is configured to automatically capture the user data associated with a user; and a data platform accessible by the plurality of electronic devices executing the data application through one or more networks, wherein the data platform receives user preferences through a secure user interface for managing the user data in the data platform, automatically captures the user data from a plurality of sources according to the user preferences utilizing the data platform, wherein the data platform periodically scans the plurality of sources and encrypts the user data that is captured, tokenizes the user data in one or more blockchain tokens utilizing the data platform, monetizes the user data in accordance with the user preferences; and compensates the user for monetizing the user data, wherein payments to the user are implemented by the data platform with one or more of the plurality of electronic devices.

12. The system of claim 11, wherein the data platform captures initial data included in the user data, modifies the user data, and verifies the user data.

13. The system of claim 11, wherein the user data is vended to one or more parties for a negotiated price.

14. The system of claim 11, wherein the data platform further generates a timestamp for a transaction associated with the vending, store transaction information including the timestamp as part of the vending, and ensures secure utilization of the user data.

15. The system of claim 11, wherein a smart contract controls utilization of the user data by the data platform.

16. A data platform, comprising:

a processor for executing a set of instructions;

a memory for storing the set of instructions, wherein the set of instructions are executed to:

receive user preferences for managing user data through a secure interface of the data platform, automatically capture the user data from a plurality of sources according to the user preferences utilizing the data platform, wherein the data platform periodically scans the plurality of sources and encrypts the user data that is captured, tokenize the user data in one or more blockchain tokens utilizing the data platform, monetize the user data in accordance with the user preferences, and compensate the user for monetizing the user data as tracked by a distributed ledger.

17. The data platform of claim 16, wherein the set of instructions are further executed to:

receive initial data included in the user data, modify the user data, update the user data, and verify the user data.

18. The data platform of claim 16, wherein the user data is stored in the one or more blockchain tokens.

19. The data platform of claim 16, wherein the user data is accessed from a secure location utilizing the one or more blockchain tokens.

20. The data platform of claim 16, wherein the set of instructions are further executed to:

ensure secure utilization of the user data.

* * * * *